(12) United States Patent
Huijsmans

(10) Patent No.: US 7,459,226 B2
(45) Date of Patent: Dec. 2, 2008

(54) SOLID OXIDE FUEL CELL

(75) Inventor: Jozef Peter Paul Huijsmans, Amsterdam (NL)

(73) Assignee: Shell Oil Company, Houston, TX (US)

( * ) Notice: Subject to any disclaimer, the term of this patent is extended or adjusted under 35 U.S.C. 154(b) by 748 days.

(21) Appl. No.: 10/513,633

(22) PCT Filed: May 8, 2003

(86) PCT No.: PCT/EP03/04905

§ 371 (c)(1),
(2), (4) Date: Nov. 5, 2004

(87) PCT Pub. No.: WO03/096469

PCT Pub. Date: Nov. 20, 2003

(65) Prior Publication Data

US 2005/0255356 A1 Nov. 17, 2005

(30) Foreign Application Priority Data

May 8, 2002 (EP) .................................. 02253226

(51) Int. Cl.
*H01M 8/12* (2006.01)
(52) U.S. Cl. .......................................... 429/31; 429/32
(58) Field of Classification Search .................. 429/30, 429/31, 32, 33
See application file for complete search history.

(56) References Cited

U.S. PATENT DOCUMENTS

| 5,998,053 A | 12/1999 | Diethelm | 429/14 |
| 6,432,565 B1 * | 8/2002 | Haines | 429/33 X |

FOREIGN PATENT DOCUMENTS

| DE | 4430958 | 10/1995 |
| EP | 0964466 | 12/1999 |
| WO | 99/10945 | 3/1999 |

OTHER PUBLICATIONS

International Search Report dated Aug. 4, 2003.

* cited by examiner

*Primary Examiner*—Stephen J. Kalafut

(57) ABSTRACT

The invention relates to a solid oxide fuel cell having an inlet for fuel, an inlet for air, an outlet for product gas, an outlet for depleted air, a fuel flow path between the inlet for fuel and the outlet for product gas, an air flow path between the inlet for air and the outlet for air, and elements having an upstream part and a downstream part, wherein the upstream part has an anode layer, a cathode layer and an oxygen ion-conductive layer between the anode and the cathode layer, and wherein the downstream part has an oxygen ion- and electron-conductive layer. The invention further relates to a process for the generation of electricity and the production of carbon dioxide from a hydrocarbonaceous fuel using such a fuel cell.

20 Claims, 3 Drawing Sheets

SOLID OXIDE FUEL CELL

The present application claims priority on European Patent Application 02253226.1 filed 8 May 2002.

FIELD OF THE INVENTION

The present invention relates to a solid oxide fuel cell comprising a plurality of elements each having an upstream part and a downstream part and to a process for the generation of electricity and the production of carbon dioxide using such a solid oxide fuel cell.

BACKGROUND OF THE INVENTION

A solid oxide fuel cell is a fuel cell comprising a plurality of anode layers and cathode layers separated from each other by means of a solid electrolyte layer. The solid electrolyte is for example zirconia that is fully or partially stabilised with yttria. Charge transfer through the solid electrolyte layer from the cathode to the anode is done by oxygen ions.

The overall cathode reaction of a solid oxide fuel cell is:

$$\tfrac{1}{2}O_2 + 2e^- \rightarrow O^{2-};$$

and the overall anode reaction is:

$$H_2 + CO + O^{2-} \rightarrow H_2O + CO_2 + 2e^-.$$

The anode off-gas thus comprises carbon dioxide and water.

Typically in a tubular solid oxide fuel cell, off-gases, i.e. anode off-gas and oxygen-depleted air, are mixed and thus form a mixture comprising a large amount of nitrogen and small amounts of carbon dioxide, water and hydrogen. If however carbon dioxide could be obtained in a highly concentrated form, preferably above 80 vol %, it can be efficiently liquefied and subsequently used in enhanced oil recovery or the recovery of coal bed methane. Also for effective sequestration of carbon dioxide, a concentrated carbon dioxide stream is needed. Carbon dioxide in lower concentration, e.g. 50 vol %, can usefully be applied in the food and paper industry.

SUMMARY OF THE INVENTION

In WO 99/10945, a process for generating electricity using a tubular solid oxide fuel cell in which process a stream rich in carbon dioxide is produced, is disclosed. In the process of WO 99/10945, oxygen-depleted air and anode off-gas are separately discharged from the solid oxide fuel cell and the anode off-gas is oxidised in a ceramic afterburner to produce a stream mainly comprising carbon dioxide and water. Water is then removed from this stream by condensation.

The present invention is directed to a solid oxide fuel cell comprising an inlet for fuel, an inlet for air, an outlet for product gas, an outlet for depleted air, a fuel flow path between the inlet for fuel and the outlet for product gas, an air flow path between the inlet for air and the outlet for air, and a plurality of elements each having an upstream part and a downstream part, wherein the upstream part comprises an anode layer, a cathode layer and an oxygen ion-conductive layer between the anode and the cathode layer, and wherein the downstream part comprises an oxygen ion- and electron-conductive layer.

BRIEF DESCRIPTION OF THE DRAWINGS

It has now been found that a ceramic afterburner can be integrated into a solid oxide fuel cell. The plates or tubes of such an integrated fuel cell have an upstream part having a fuel cell function and a downstream part having an afterburner function. An advantage of such an integrated system is that no means for separating the anode-off gas and the oxygen-depleted air are needed between the fuel cell part and the afterburner part of the system, since these gases are still separated from each other when contacting the afterburner part of the system.

DETAILED DESCRIPTION OF THE INVENTION

Figure 1:
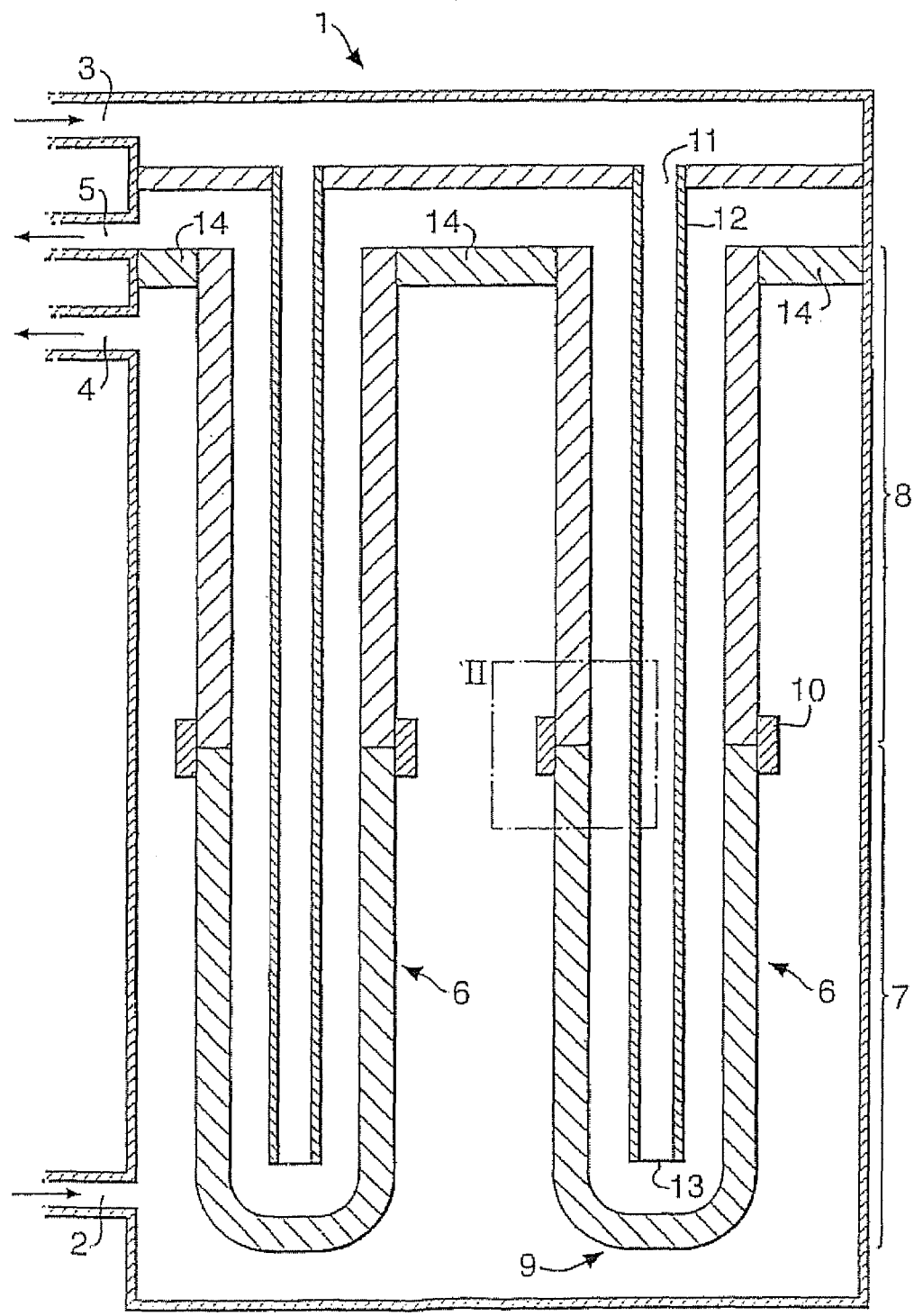
FIG. 1 schematically shows a longitudinal section of a tubular solid oxide fuel cell according to a first embodiment of the invention.

The elements are either flat plates or tubes to form a planar or tubular solid oxide fuel cell, respectively. Each element of the solid oxide fuel cell according to the invention has an upstream part having a fuel cell function and a downstream part having an afterburner function. Upstream and downstream is defined with respect to the flow of fuel during normal operation, i.e. the upstream part is the part nearest to the inlet for fuel and the downstream part is the part nearest to the outlet for product gas.

The upstream part of each element has a composition, which is typical for a solid oxide fuel cell, i.e. an anode layer, a cathode layer and a solid electrolyte layer between the anode and the cathode layer. Anode, cathode and electrolyte layers for solid oxide fuel cells are know in the art. The anode layer is a porous layer, usually composed of a ceramic metal composite. A commonly used anode material comprises Ni and yttria-stabilised zirconia. The cathode layer is a porous layer of an electron-conductive ceramic material, typically a mixed metal oxide having a perovskite structure. Lanthanum-strontium-manganese oxides are a commonly used cathode material. The solid electrolyte layer of a solid oxide fuel cell is oxygen-ion conductive and has very limited conductivity for electrons. This layer is dense and impermeable to gases. Yttria-stabilised zirconia is commonly used.

In fuel cells, all elements, i.e. the tubes or plates, are electrically connected to each other. In the fuel cell according to the invention, all upstream parts of the elements, i.e. the parts having a fuel cell are electrically connected to each other by means known in the art.

The downstream part of each element comprises a layer having both oxygen ion- and electron-conductivity, which layer is in the form of a dense ceramic membrane and is impermeable to gases. This layer is further referred to as mixed conductive layer. Such ceramic membranes are known in the art. Examples are composites of metals and ceramic materials (cermets), bismuth oxides, and mixed oxides such as perovskites. The mixed conductive layer of the downstream part of each element may be supported on a porous ceramic layer.

Preferably, the fuel cell according to the invention is a tubular solid oxide fuel cell wherein each element is a tube. In the tubular fuel cell according to the invention, the upstream part of each tube has the anode layer at its outside and the cathode layer at its inside. The tubes preferably have the shape of round cylinders, but oval tubes may be applied. Instead of a plurality of tubes, the tubular fuel cell may comprise one or more elongate monolithic structures having a plurality of parallel, elongate channels. In the upstream part of the elongate monolithic structure, the cathode layer is at the inside of each channel and the anode layer at the outside of the monolithic structure.

Preferably, each tube is closed at its upstream end. This means that the air to be fed to the cathode layer, i.e. to the inside of the tube or channel, will be supplied via the downstream end of the tube or channel, counter-currently to the fuel flow.

In a first embodiment of the present invention, the first and the second part of each tube are distinct tubes that are connected to each other by high-temperature resistant gas-tight joints. The upstream and downstream part are connected in such a way that together they form a tube. Since both parts of the tube are distinct, the composition and thickness of each part can be optimized for its function, i.e. fuel cell or afterburner function.

The joints may be any joints that can attach ceramic parts to each other in a gas-tight manner under high-temperature conditions. Such joints are known in the art and may, for example, comprise a ceramic O-ring combined with a metal flange.

In other embodiments of the invention, the cathode layer of the upstream part and the porous support layer of the downstream part of each element form a single plate or tube of the same ceramic material. The other layers, i.e. the electrolyte layer and the anode layer of the upstream part and the mixed conductive layer of the downstream part are applied to this porous single plate or tube by techniques known in the art, e.g. dipcoating, slipcasting or plasma spraying. It is preferred to apply all these layers to the same side of the porous single plate or tube, since a continuous gas-impermeable layer can thus be formed by the electrolyte and the mixed conductive layer in order to keep the gases in the fuel flow path and the air flow path separated from each other.

During normal operation of the fuel cell according to the invention, a hydrocarbonaceous fuel is fed via the inlet for fuel to the anode side of the elements. Air is fed via the inlet for air to the cathode side of each element. In the upstream part of the elements, the cathode and anode reactions take place resulting in the generation of electricity and the production of anode off-gas comprising hydrogen, carbon oxides, water and fuel at the anode side of the elements. Partially-depleted air is formed at the cathode side of the elements. Since the elements are impermeable to gases, the anode off-gas flows to the downstream part of the element and will contact the mixed conductive layer at the surface that is facing the fuel flow path, i.e. the surface at the same side of the element as the anode layer. Oxygen, from the partially-depleted air formed at the cathode and/or from air directly supplied via the air inlet, will contact the mixed conductive layer at its opposite surface, i.e. the surface that is facing the air flow path which is the surface that is at the same side of the element as the cathode side.

The oxygen reacts with electrons to form oxygen-ions at the surface of the mixed conductive layer. The thus-formed oxygen-ions are transported through the mixed conductive layer to the surface facing the fuel flow path and react with the hydrogen, carbon monoxide and fuel in the anode off-gas to form water, carbon dioxide and electrons. The thus-formed electrons are transported through the mixed conductive layer to the surface facing the air flow path. Thus, product gas mainly comprising carbon dioxide and water is formed at the surface of the mixed conductive layer facing the fuel flow path and depleted air is formed at the surface of the mixed conductive layer facing the air flow path.

Accordingly, the invention further is directed to a process for the generation of electricity and the production of carbon dioxide from a hydrocarbonaceous fuel, wherein, in a solid oxide fuel cell as hereinabove defined;

a) air is contacted with the cathode layer and a hydrocarbonaceous fuel or a partially reformed hydrocarbonaceous fuel is contacted with the anode layer;

b) by allowing the cathode and anode reactions to take place in the upstream part of the elements, electricity is generated and an anode off-gas comprising hydrogen, carbon oxides, water and fuel is formed at the anode side, and partially-depleted air is formed at the cathode side of the elements;

c) the anode off-gas is reacted with oxygen ions at the surface of the oxygen ion- and electron-conductive layer facing the fuel flow path to form a product gas mainly comprising carbon dioxide and water, and depleted air is formed at the surface of the oxygen ion- and electron-conductive layer facing the air flow path.

The product gas and the depleted air are separately discharged from the fuel cell via the outlet for product gas and the outlet for air, respectively. In the tubular solid oxide fuel cell according to the invention, the product gas and the depleted air may be kept separated from each other by placing seals between the fuel and the air flow path near the tube outlets. Ceramic seals are examples of suitable seals. It is advantageous to cool the gases before they are discharged from the fuel cell, since this makes sealing the fuel flow path from the air flow path simpler.

Preferably, a gas stream rich in carbon dioxide is obtained by partially condensing the product gas and removing the condensed water from it. The thus-obtained carbon dioxide rich gas stream may be used for enhanced oil recovery or recovery of coal bed methane.

The fuel may be any gaseous or vaporized hydrocarbonaceous fuel, preferably the fuel is a hydrocarbon stream that is gaseous at STP conditions (0° C. and 1 atm.) such as natural gas, methane, ethane or LPG, more preferably the fuel is natural gas.

The anode layer of a solid oxide fuel cell allows some internal steam reforming of hydrocarbons. Therefore, the hydrocarbonaceous fuel may be directly fed to the anode side of the fuel cell. It is, however, preferred that at least part of the fuel is pre-reformed to form mixture comprising hydrogen and carbon monoxide prior to contacting it with the anode layer of the upstream part of the elements. Reference herein to fuel is to a hydrocarbonaceous fuel or to pre-reformed or partially pre-reformed hydrocarbonaceous fuel.

The solid oxide fuel cell and the process according to the invention will be illustrated by means of FIGS. 1 to 4.

In FIG. 1 is shown a solid oxide fuel cell 1 having an inlet for fuel 2, an inlet for air 3, an outlet for product gas 4, an outlet for depleted air 5 and a plurality of tubes 6. Only two tubes are shown. Each tube 6 has an upstream part 7 and a downstream part 8 and is closed at the upstream end 9. The upstream 7 and the downstream part 8 of each tube 6 are distinct tubes that are connected to each other by means of a gas-tight joint 10.

During normal operation, air is supplied to the inside of each tube 6 via the downstream end 11 of tube 6 by means of an air supply conduit 12 having its outlet 13 in the upstream part 7 of the tube 6. In this way, the air is pre-heated before it contacts the cathode layer. Fuel is fed to fuel cell 1 via fuel inlet 2 and will react at the outside or anode side of the upstream part 7 of tube 6 and the thus-formed anode off-gas will flow to the outside of the downstream part 8 of tube 6. In the downstream part of the tube, hydrogen, carbon monoxide and fuel in the anode off-gas will be oxidised to a product gas rich in carbon dioxide and steam. This product gas is discharged from fuel cell 1 via product outlet 4. Depleted air is discharged via outlet 5. Seal 14 keeps the product gas and the depleted air separated from each other.

Figure 2:
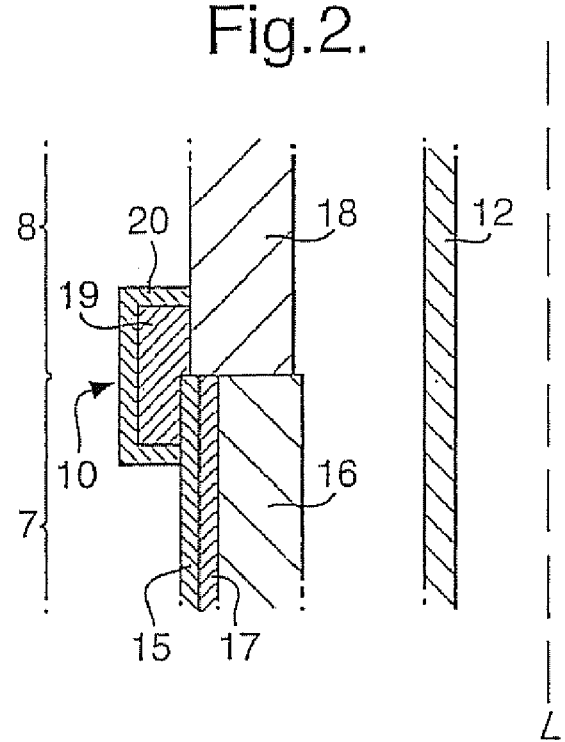
FIG. 2 shows a longitudinal section of a detail of a tube of the solid oxide fuel cell of FIG. 1.

In FIG. 2 is shown part of tube 6 of the solid oxide fuel cell of FIG. 1. Line L is the longitudinal axis of tube 6. The layered structure of the upstream part 7 of tube 6 and joint 10 connecting the upstream 7 and the downstream part 8 of tube 6 to each other are shown in more detail. The upstream part 7 of tube 6 has an anode layer 15 at the outside, a cathode layer 16 at the inside and a solid electrolyte layer 17 between the anode and the cathode layer. The downstream part 8 of tube 6 is distinct from the upstream part 7 and has a single layer 18 of ceramic material, which is a mixed conductive layer. Joint 10 provides for a gas-tight connection between the upstream 7 and the downstream part 8 of tube 6. Joint 10 is formed by the combination of ceramic O-ring 19 and metal flange 20.

Figure 3:
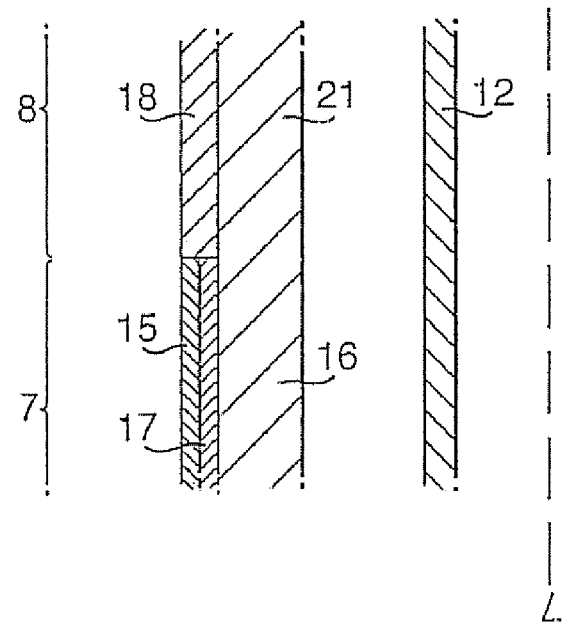
FIG. 3 shows a longitudinal section of a detail of a tube of a solid oxide fuel cell according to a second embodiment of the invention.

FIG. 3 shows part of tube 6 of solid oxide fuel cell 1 of a second embodiment of the invention. In this embodiment, the cathode layer 16 and the porous support layer 21 of the downstream part 8 of tube 6 form a single layer and are composed of the same ceramic material. The mixed conductive layer 18 is located on the outside of the support layer 21, such that the electrolyte layer 17 and the mixed conductive layer 18 form a continuous gas-impermeable layer to prevent gases from passing from the outside to the inside of the tube.

Figure 4:
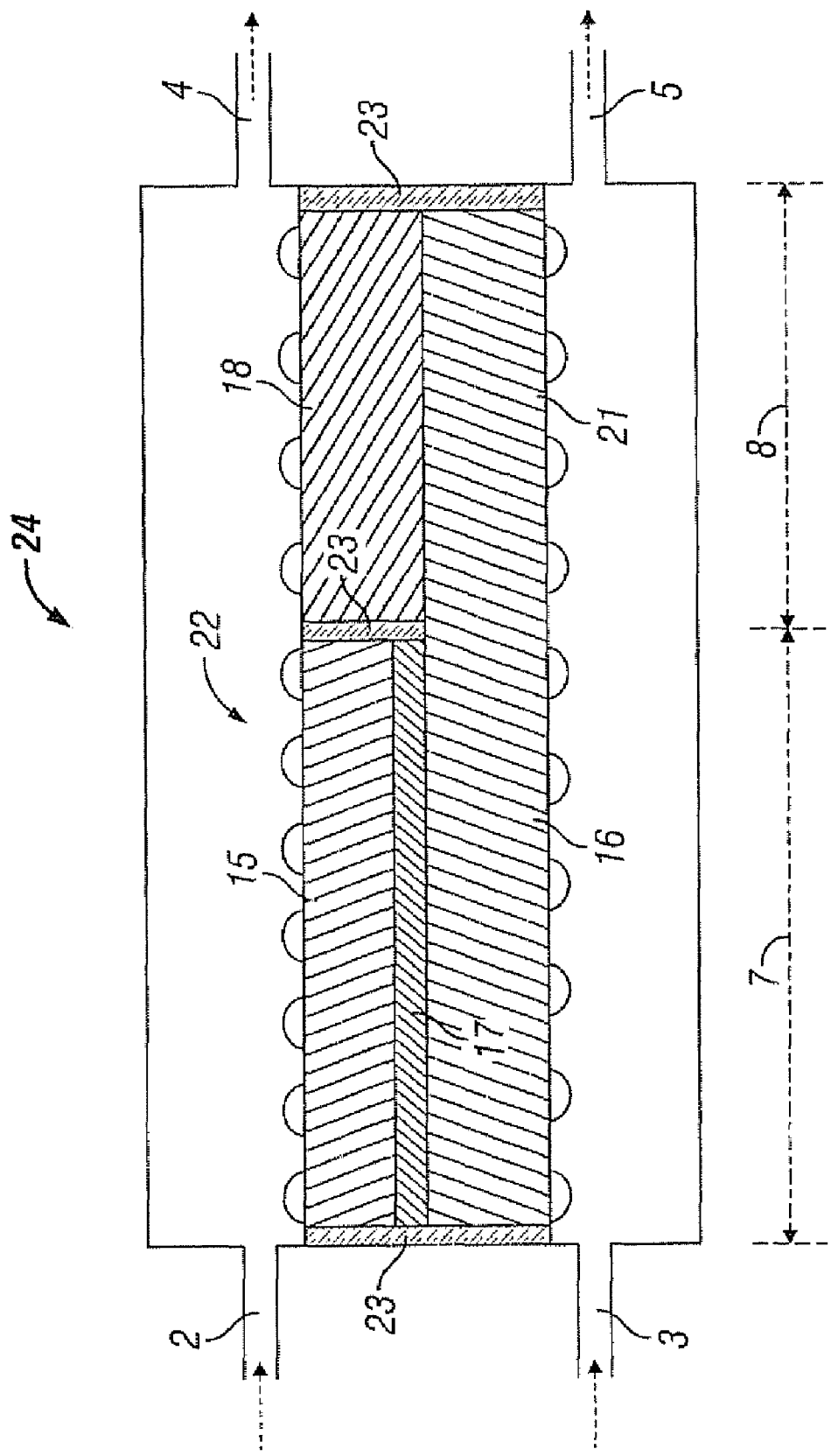
FIG. 4 schematically shows a section of a flat plate solid oxide fuel cell.

FIG. 4 shows a chamber 24 of a solid oxide fuel cell containing a flat plate 22. The cathode layer 16 of the upstream part 7 and the porous support layer 21 of the downstream part 8 form a single plate and are composed of the same ceramic material. The mixed conductive layer 18 is located on top of the support layer 21 in the downstream part 8. The electrolyte layer 17 is located on top of the cathode layer 16 and the anode layer 15 is located on top of the electrolyte layer 17 in the upstream part 7. Joints 23 provide for a gas-tight connection between the ends of the flat plate 22 and the walls of the chamber 24 as well as between the mixed conductive layer 18, the electrolyte layer 17, and the anode layer 15. The chamber 24 may be made of metal and multiple chambers may be stacked together in a solid oxide fuel cell.

I claim:

1. A solid oxide fuel cell comprising an inlet for fuel, an inlet for air, an outlet for product gas, an outlet for depleted air, a fuel flow path between the inlet for fuel and the outlet for product gas, an air flow path between the inlet for air and the outlet for air, and a plurality of elements each having an upstream part and a downstream part, wherein the upstream part comprises an anode layer, a cathode layer and an oxygen ion-conductive layer between the anode and the cathode layer, and wherein the downstream part comprises an oxygen ion- and electron-conductive layer.

2. The solid oxide fuel cell of claim 1, wherein the downstream part of the elements further comprises a porous layer supporting the oxygen ion- and electron-conductive layer.

3. The solid oxide fuel cell of claim 2, wherein the cathode layer of the upstream part of the element and the porous layer supporting the oxygen ion- and electron-conductive layer of the downstream part of the element are the same layer.

4. The solid oxide fuel cell of claim 3, wherein the elements are flat plates.

5. The solid oxide fuel cell of claims 1, wherein the elements are tubes and the anode layer is located at the outside of the upstream part of the tube and the cathode layer at the inside of the upstream part of the tube.

6. The solid oxide fuel cell of claim 5, wherein the upstream part and the downstream part of each tube are distinct tubes that are connected to each other by means of a high-temperature resistant, gas-tight joint.

7. The solid oxide fuel cell of claim 5, wherein each tube is closed at its upstream end.

8. A process for the generation of electricity and the production of carbon dioxide from a hydrocarbonaceous fuel, wherein, in a solid oxide fuel cell comprising an inlet for fuel, an inlet for air, an outlet for product gas, an outlet for depleted air, a fuel flow path between the inlet for fuel and the outlet for product gas, an air flow path between the inlet for air and the outlet for air, and a plurality of elements each having an upstream part and a downstream part, wherein the upstream part comprises an anode layer, a cathode layer and an oxygen ion-conductive layer between the anode and the cathode layer, and wherein the downstream part comprises an oxygen ion- and electron-conductive layer, the process comprising:
   a) contacting the cathode layer with air; and, contacting a hydrocarbonaceous fuel or a partially reformed hydrocarbonaceous fuel with the anode layer;
   b) allowing the cathode and anode reactions to take place in the upstream part of the elements; generating electricity and an anode off-gas comprising hydrogen, carbon oxides, water and fuel; and, forming partially-depleted air at the cathode side of the elements;
   c) reacting the anode off-gas with oxygen ions at the surface of the oxygen ion- and electron-conductive layer facing the fuel flow path to form a product gas mainly comprising carbon dioxide and water; and forming depleted air at the surface of the oxygen ion- and electron-conductive layer facing the air flow path.

9. The process of claim 8, further comprising partially condensing the product gas; and, removing water from it to produce a stream rich in carbon dioxide.

10. The process of claim 8, further comprising converting at least part of the hydrocarbonaceous fuel into a mixture comprising hydrogen and carbon monoxide prior to contacting it with the anode surface of the upstream part of the elements.

11. The solid oxide fuel cell of claim 2, wherein the elements are tubes and the anode layer is located at the outside of the upstream part of the tube and the cathode layer at the inside of the upstream part of the tube.

12. The solid oxide fuel cell of claim 3, wherein the elements are tubes and the anode layer is located at the outside of the upstream part of the tube and the cathode layer at the inside of the upstream part of the tube.

13. The solid oxide fuel cell of claim 12, wherein the upstream part and the downstream part of each tube are distinct tubes that are connected to each other by means of a high-temperature resistant, gas-tight joint.

14. The solid oxide fuel cell of claim 6, wherein each tube is closed at its upstream end.

15. The process of claim 9, further comprising converting at least part of the hydrocarbonaceous fuel into a mixture comprising hydrogen and carbon monoxide prior to contacting it with the anode surface of the upstream part of the elements.

16. The process of claim 9, wherein in the solid oxide fuel cell the downstream part of the elements further comprises a porous layer supporting the oxygen ion- and electron-conductive layer.

17. The process of claim 16, wherein the cathode layer of the upstream part of the element and the porous layer supporting the oxygen ion- and electron-conductive layer of the downstream part of the element are the same layer.

18. The process of claim 17, wherein in the solid oxide fuel cell the elements are flat plates.

19. The process of claim 9, wherein in the solid oxide fuel cell the elements are tubes and the anode layer is located at the outside of the upstream part of the tube and the cathode layer at the inside of the upstream part of the tube.

20. The process of claim 9, wherein in the solid oxide fuel cell, the upstream part and the downstream part of each tube are distinct tubes that are connected to each other by means of a high-temperature resistant, gas-tight joint.

* * * * *